United States Patent
Ludwig et al.

(10) Patent No.: US 7,467,392 B1
(45) Date of Patent: Dec. 16, 2008

(54) SYSTEM AND METHOD FOR SUPPORTING NEW AND EXISTING EXTENSIONS TO APPLICATION PROGRAMMING INTERFACES

(75) Inventors: Charles Alan Ludwig, Renton, WA (US); Anand Ganesh, Redmond, WA (US); James H. Dooley, IV, Bellevue, WA (US); David A. Goll, Seattle, WA (US); Robin C. B. Speed, Winchester (GB)

(73) Assignee: Microsoft Corporation, Redmod, WA (US)

( * ) Notice: Subject to any disclaimer, the term of this patent is extended or adjusted under 35 U.S.C. 154(b) by 864 days.

(21) Appl. No.: 10/938,399

(22) Filed: Sep. 10, 2004

(51) Int. Cl.
*G06F 13/00* (2006.01)
(52) U.S. Cl. .................................. 719/328; 710/19
(58) Field of Classification Search ................ 719/328; 710/1, 5, 8, 19
See application file for complete search history.

(56) References Cited

U.S. PATENT DOCUMENTS

| | | | | |
|---|---|---|---|---|
| 5,911,068 | A * | 6/1999 | Zimmerman et al. | 719/328 |
| 6,085,265 | A * | 7/2000 | Kou | 710/63 |
| 6,223,207 | B1 | 4/2001 | Lucovsky et al. | |
| 6,457,066 | B1 | 9/2002 | Mein et al. | |
| 6,671,744 | B1 * | 12/2003 | Naito et al. | 719/321 |
| 6,694,378 | B1 * | 2/2004 | Lortz | 719/321 |
| 6,711,181 | B1 * | 3/2004 | Xue et al. | 370/504 |
| 6,918,118 | B2 * | 7/2005 | Standridge et al. | 719/310 |

OTHER PUBLICATIONS

Biome et al; "DirectShow—Core media technology in Windows XP empowers you to create custom audio/video processing components"; Computer Science, Technology & Applications; MSDN Magazine, 2002 vol. 17, No. 7; July; 13 pages.
Cline et al.; "Directshow/sup TM/RTP support for adaptivity in networked multimedia applications"; Proceedings IEEE International Conferenced on Multimedia Computing and Systems; Jun. 28-Jul. 1, 1998, Austin TX.
DeviceIoControl; Platform SDK; Device I/O; MSDN Microsoft. com; 1 page; printed Aug. 5, 2004.
Eidenbert et al.; "VizIR-a Framework for visual information retrieval"; Journal of Visual Languages and Computing, vol. 14, No. 5; pp. 443-469; Oct. 2003.
GetQueuedCompletionStatus; Platform SDK: Storage; MSDN Microsoft.com; printed Aug. 5, 2004; 3 pages.
IKsControl; Streaming Devices (Video and Audio): Windows DDK; Build on Monday, Jun. 14, 2004. MSDN Microsoft.com; printed Aug. 5, 2004; 15 pages.
Overlapped; Platform SDK: DLLs, Processes, and Threads; MSDN Microsoft.com; printed Aug. 5, 2004; 2 pages.

(Continued)

*Primary Examiner*—Meng-Ai An
*Assistant Examiner*—Phuong N Hoang
(74) *Attorney, Agent, or Firm*—Lee & Hayes, PLLC (57) ABSTRACT

A component, such as a Component Object Model (COM) object, operates as an intermediary between an Application Programming Interface (API) extension or plug-in and a driver. The component allows additional objects to be aggregated onto the component, and/or sets one or more setting values for a received request so that an I/O call associated with the request can be completed in a manner that is compatible with other I/O calls. The component may also return, in response to a particular request, a stream index associated with the component.

22 Claims, 3 Drawing Sheets

OTHER PUBLICATIONS

Ozer; "The DVD/MCI mess. Problems witgh DVD publishing and solutions for developers"; EMedia Professional vol. 10, No. 12, pp. 54-56, 58, 60, 62-64, 66. Dec. 1997.

Souter et al.; "Contextual def-use associations for object aggregation"; ACM 2001 ACM SIGPLAN-SIGSOFT Workshop on Program Analysis for Software Tools and Engineering; Jun. 18-19, 2001, Snowbird, UT; pp. 13-19.

The Component Object Model, MSDN Microsoft.com; printed Aug. 2, 2004, 22 pages.

Thomas et al.; "Framework for development and distribution of hardware acceleration"; Proceedings of the SPIE; vol. 4867; pp. 48-59, Jul. 30, 2002, Boston MA.

* cited by examiner

SYSTEM AND METHOD FOR SUPPORTING NEW AND EXISTING EXTENSIONS TO APPLICATION PROGRAMMING INTERFACES

TECHNICAL FIELD

This invention relates to application programming interfaces, and particularly to systems and method for supporting new and existing extensions to application programming interfaces.

BACKGROUND

As computing technology has advanced, computers have become increasingly popular for use with a wide variety of applications, including multimedia applications. Multimedia applications offer a wide variety of functionality, including the recording, playback, storage, editing, and so forth of audio and/or video data. Additional hardware is also available for computers, this additional hardware often being designed and/or manufactured by a different person or company than that which designed and/or manufactured the computer. This additional hardware, such as cameras, television capture devices, storage devices, and so forth provides different functionality for applications running on the computer. Furthermore, the same type of hardware (e.g., cameras) designed by different manufacturers may support different functionality.

The computer typically has an architecture that includes a program, referred to as a driver, that runs to allow the multimedia application on the computer to access and use particular hardware. A different driver is typically used for each different piece of hardware. An application running on the computer typically invokes one or more interfaces exposed by an Application Programming Interface (API) on the computer, which interacts with the driver for the particular piece of hardware in order for the commands of the multimedia application to be carried out. Different extensions or plug-ins can be added to the API to support the various functionality of the hardware and drivers. An example of one such API to which extensions can be added is the DirectShow® API available from Microsoft Corporation of Redmond, Wash.

One problem that exists with such architectures, however, arises when changes are made to the API to which the extensions can be added, particularly when significant changes are made to the API. Such changes can result in the situation where the API extensions have to be changed significantly in order to work with the new API. Such changes can require a significant amount of time to make, and may leave the changed API extension unusable with the previous version of the API. Thus, it would be beneficial to have a way to make changes to the API that reduce any necessary changes to the API extensions, and that allow the changed API extensions to be backwards compatible with the previous version of the API.

SUMMARY

Systems and methods for supporting new and existing extensions to application programming interfaces are discussed herein.

In accordance with certain aspects, a request that is associated with an Input/Output (I/O) call is received from an API plug-in or extension. The API plug-in or extension includes one or more interfaces to allow an application to invoke functionality supported by a driver associated with the API plug-in or extension. One or more setting values are set, on behalf of the API plug-in or extension, for the request so that the request is compatible with requests associated with other I/O calls. This setting may be, for example, setting of a flag in an event handle for the I/O call, the flag indicating that an I/O completion port is not to be signaled when the I/O call is completed. After the setting value(s) are set, the driver is invoked to carry out the I/O call.

In accordance with other aspects, a Component Object Model (COM) object sets the one or more setting values and invokes the driver to carry out the I/O call. This COM object also aggregates, in response to a request, one or more additional API plug-ins or extensions in order to allow interfaces of the one or more additional API plug-ins or extensions to be exposed and invoked using I/O calls.

In accordance with other aspects, a Component Object Model (COM) object is an intermediary between an Application Programming Interface (API) extension or plug-in and a driver. The COM object receives, from the API extension or plug-in, a request for a stream index associated with the COM object. In response to the request, the COM object returns the stream index associated with the COM object. In certain implementations, the request comprises a GetStreamIndex interface being invoked.

BRIEF DESCRIPTION OF THE DRAWINGS

The same numbers are used throughout the document to reference like components and/or features.

DETAILED DESCRIPTION

Systems and methods for supporting new and existing extensions to application programming interfaces are discussed herein. A component, referred to as a stub, operates as an intermediary between Application Programming Interface (API) extensions and device drivers. These API extensions can be used to extend the functionality available to both new and legacy applications. Functionality of the drivers can be invoked by the API extensions invoking an interface on the stub, which in turn invokes the desired driver. The stub can also be used as a basis for aggregation of objects, allowing multiple extensions to be added to the API.

Figure 1:
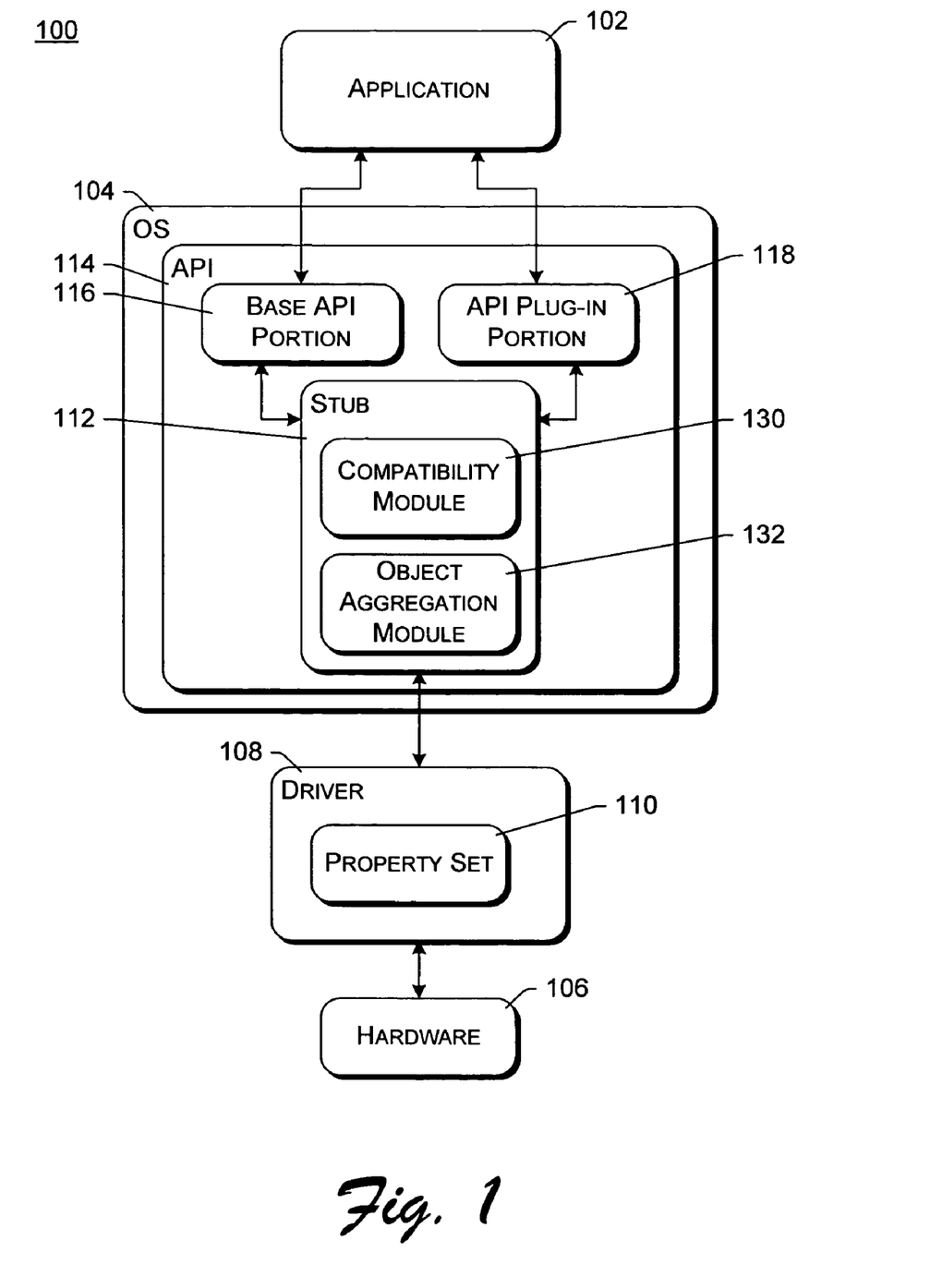
FIG. 1 illustrates an example system supporting new and existing extensions to application programming interfaces.

FIG. 1 illustrates an example system 100 supporting new and existing extensions to application programming interfaces. System 100 includes an application 102, an operating system (OS) 104, a device or hardware 106, and a device driver 108 having a property set 110. Operating system 104 includes a stub component 112 included as part of an Application Programming Interface (API) 114. API 114 also includes a base API portion 116 and a plug-in API portion (also referred to as an extension API portion) 118. Although device driver 108 is shown separately from OS 104, device driver 108 may alternatively be part of OS 104. Additionally, although only a single application 102, single driver 108, and single device or hardware 106 are illustrated in FIG. 1, system 100 may include multiple applications 102, multiple drivers 108, and/or multiple device or hardware 106.

Driver 108 is a set of instructions, oftentimes a relatively small computer program (relative to application 102), that is associated with hardware 106. In certain embodiments, driver 108 is a kernel streaming driver that supports kernel-mode processing of streamed data. Streamed data is data that is received at system 100 by a process referred to as streaming. Streaming refers to the data for media content (e.g., data for audio content, data for video content, data for image content, etc.) being received at system 100 and playback of the media content at system 100 being allowed to begin before all of the media content is received at system 100. For example, if the media content is a song having a playback duration of three minutes, then playback of the song can begin after the first few seconds (e.g., ten or fifteen seconds) of the song have been received rather than delaying the start of playback of the song until all three minutes of the song are received.

Driver 108 allows other programs in system 100 to access the functionality of hardware 106. Hardware 106 can be any of a variety of different devices that can be connected to a computing device. Hardware 106 can refer to internal components (e.g., those that are internal to a computing device, such as cards that are physically plugged into a slot of the computing device) as well as external components (e.g., those that are external to a computing device, such as devices connecting to the computing device via a Universal Serial Bus (USB) or IEEE 1394 connection). Examples of hardware 106 include video and/or audio capture devices (e.g., cameras, television capture devices, camcorders, microphones, etc.), video and/or audio playback devices, storage devices, and so forth.

Property set 110 defines the format of communications that driver 108 understands. For example, in certain embodiments property set 110 defines a set of one or more messages that can be understood by driver 108. Each such message would include, for example, an identifier (e.g., a globally unique identifier (GUID), a name, etc.) of the message as well as zero or more parameters for the message. Any component, such as stub 112, that desires to communicate with driver 108 does so in accordance with the communication format(s), such as the different supported messages, defined in property set 110.

API 114 exposes one or more interfaces to application 102. API 114 includes a base API portion 116 and an API plug-in or extension portion 118. Base API portion 116 includes a basic set of API interfaces, such as those that are designed by the designer of OS 104. This basic set of API interfaces typically includes interfaces that support functionality of hardware that is oftentimes shipped with OS 114 and/or oftentimes used with OS 114. For example, if a particular microphone (or other audio capture device) is typically used with OS 114, then a driver 108 for that microphone would typically be included in OS 114 and an interface that allows application 102 to capture audio data using that microphone would typically be included in base API 106.

API plug-in portion 118 includes one or more additional API interfaces that are typically designed by some third party that is different from the designer of OS 104. A particular API plug-in (also referred to as an API extension) is an object that includes one or more API interfaces designed to know how to communicate with an associated driver 108 (e.g., understands the communication formats described in property set 110 of the associated driver) and further to expose one or more interfaces to allow application 102 to invoke particular functions of driver 108 and hardware 106. As these interfaces in API plug-in portion 118 are added to API 114 and expand the functionality exposed by API 114, they are referred to as API extensions or plug-ins. For example, assume that a third party manufacturer designs a new web camera with new functionality. The third party manufacturer also designs an API plug-in that exposes one or more interfaces allowing application 102 to invoke the new functionality, and that communicates with driver 108 to perform the new functionality when invoked by application 102.

Stub 112 is a component that operates as an intermediary between API 114 and driver 108. Communications from interfaces of API 114 to driver 108 are passed through stub 112. In certain embodiments, stub 112 is a component object model (COM) object that exposes an interface referred to as IKsControl. Additional information regarding COM objects is available from Microsoft Corporation of Redmond, Wash.

The IKsControl interface includes a KsProperty method, a KsMethod method, and a KsEvent method. The KsProperty method allows for the setting of property information in, or retrieval of property information from, property set 110. The parameters for the KsProperty method are listed below in Table I.

TABLE I

| Parameter | Description |
| --- | --- |
| Property | Pointer to a KSPROPERTY structure that describes a property and the request type of the property request. |
| PropertyLength | Size, in bytes, of the buffer at Property. |
| PropertyData | Pointer to a buffer that contains data for an operation, or buffer space that receives data for an operation. |
| DataLength | Size, in bytes, of the buffer at PropertyData. |
| BytesReturned | Pointer to a variable that receives the size, in bytes, of the data that the KsProperty method stores in the buffer at PropertyData. If no data is stored, the size is zero. |

The KsMethod method sends a method to stub 112. This method sent to stub 112 is the request to carry out the I/O call made by application 102. The parameters for the KsMethod method are listed below in Table II.

TABLE II

| Parameter | Description |
| --- | --- |
| Method | Pointer to a KSMETHOD structure that describes a method and the request type of the method request. |
| MethodLength | Size, in bytes, of the buffer at Method. |
| MethodData | Pointer to a buffer that contains data and buffer space for an operation, or buffer space that receives data for an operation. |
| DataLength | Size, in bytes, of the buffer at MethodData. |
| BytesReturned | Pointer to a variable that receives the size, in bytes, of the data that the KsMethod method stores in the buffer at MethodData. |

The KsEvent method enables or disables an event, allowing an interface of API 114 to request to be notified of, or no longer be notified of, particular events. The parameters for the KsEvent method are listed below in Table III.

TABLE III

| Parameter | Description |
| --- | --- |
| Event | Pointer to a KSEVENT structure that describes an event to enable the event and NULL to disable the event. |
| EventLength | Size, in bytes, of the buffer at Event when the event is enabled and zero when the event is disabled. |
| EventData | Pointer to a KSEVENTDATA structure that contains data for the event and buffer space that receives data for the event. |
| DataLength | Size, in bytes, of the buffer at EventData. |
| BytesReturned | Pointer to a variable that receives the size, in bytes, of the data that the KsEvent method stores in the buffer at EventData. |

Additional information regarding the IKsControl interface is available in the Driver Development Kit (DDK) for Windows® operating systems available from Microsoft Corporation.

API 114 communicates with or calls driver 108 by invoking a method on the interface exposed by stub 112. In response to the method being invoked, stub 112 invokes one or more functions of, or methods on interfaces that are exposed by, driver 108. In certain implementations, a DeviceIoControl function is exposed by driver 108. The DeviceIoControl function is a function that allows control code to be sent directly to driver 108, causing driver 108 and device 106 to perform a particular operation. This operation is the carrying out of the I/O call made by application 102. Any parameters that are passed to stub 112 by API 114 can also passed to driver 108 by stub 112.

The parameters for the DeviceIoControl function are listed below in Table IV.

TABLE IV

| Parameter | Description |
| --- | --- |
| hDevice | [in] Handle to the device on which the operation is to be performed. To retrieve a device handle, the CreateFile function can be used. |
| dwIoControlCode | [in] Control code for the operation. This value identifies the specific operation to be performed and the type of device on which to perform it. |
| lpInBuffer | [in] Pointer to the input buffer that contains the data required to perform the operation. The format of this data depends on the value of the dwIoControlCode parameter. This parameter can be NULL if dwIoControlCode specifies an operation that does not require input data. |
| nInBufferSize | [in] Size of the input buffer, in bytes. |
| lpOutBuffer | [out] Pointer to the output buffer that is to receive the data returned by the operation. The format of this data depends on the value of the dwIoControlCode parameter. This parameter can be NULL if dwIoControlCode specifies an operation that does not return data. |
| nOutBufferSize | [in] Size of the output buffer, in bytes. |
| lpBytesReturned | [out] Pointer to a variable that receives the size of the data stored in the output buffer, in bytes. If the output buffer is too small to receive any data, the call fails, an ERROR_INSUFFICIENT_BUFFER error is returned, and lpBytesReturned is zero. If the output buffer is too small to hold all of the data but can hold some entries, some drivers will return as much data as fits. In this case, the call fails, an ERROR_MORE_DATA error is returned, and lpBytesReturned indicates the amount of data received. If lpOverlapped is NULL, lpBytesReturned cannot be NULL. Even when an operation returns no output data and lpOutBuffer is NULL, the DeviceIoControl function makes use of lpBytesReturned. After such an operation, the value of lpBytesReturned is meaningless. If lpOverlapped is not NULL, lpBytesReturned can be NULL. If this parameter is not NULL and the operation returns data, lpBytesReturned is meaningless until the overlapped operation has completed. |
| lpOverlapped | [in] Pointer to an OVERLAPPED structure. If hDevice was opened without specifying FILE_FLAG_OVERLAPPED, lpOverlapped is ignored. If hDevice was opened with the FILE_FLAG_OVERLAPPED flag, the operation is performed as an overlapped (asynchronous) operation. In this case, lpOverlapped points to a valid OVERLAPPED structure that contains a handle to an event object. For overlapped operations, the DeviceIoControl function returns immediately, and the event object is signaled when the operation has been completed. |

TABLE IV-continued

| Parameter | Description |
| --- | --- |
| | Otherwise, the function does not return until the operation has been completed or an error occurs. |

Additional information regarding the DeviceIoControl function is available in the Platform Software Development Kit (SDK) for Windows® operating systems available from Microsoft Corporation.

The parameters of the DeviceIoControl function are provided to stub 112 as parameters when an IKsControl interface method is invoked, except for a device handle and the event handle as modified by compatibility module 130. When an event handle is being used, the event handle is received as a parameter when an IKsControl interface method is invoked, but then is modified by module 130 as discussed in more detail below. The device handle is an identifier associated with the hardware 106 and driver 108 that uniquely identifies hardware 106 in system 100. The device handle is obtained by stub 112 invoking a CreateFile function (e.g., a function of API 114 or OS 104) with the name (or other identifier) of driver 108 and/or the name (or other identifier) of hardware device 106. This name (or other identifier) or driver 108 and/or hardware device 106 is known to the interface of API that is invoking a method of the IKsControl interface, and thus is passed to stub 112 as a parameter of the invoked method.

It should be noted that the methods of the IKsControl interface do not require as a parameter a device handle associated with the hardware 106 and driver 108. Thus, in invoking the methods of the IKsControl interface, the interfaces of API 114 do not need such a device handle. However, the DeviceIoControl function does use, as a parameter, a device handle associated with the hardware 106 and driver 108. Thus, the interfaces in portions 116 and 118 do not even need the device handle, and without such handle they would not be able to access hardware 106 and driver 108 directly using the DeviceIoControl function (they would have to access hardware 106 and driver 108 through stub 112).

Application 102 often performs input/output (I/O or IO) calls to hardware 106. These I/O calls input data from and/or output data to hardware 106. During operation, when application 102 desires to invoke particular functionality of hardware 106 (e.g., capture audio data, capture video data, etc.), application 102 invokes the appropriate interface of API 114 for that functionality. This interface of API 114 could be part of base API 116 or API plug-in 118, depending on the particular functionality. The invoked interface of API 114 is designed to know how to communicate with driver 108, and formats an appropriate message for driver 108 to carry out the functionality requested by application 102. API 114 then invokes an interface of stub 112 (e.g., a method on the IKsControl interface exposed by stub 112), passing to stub 112 any parameters to be included in order to carry out the functionality requested by application 102 (these parameters will be identified in the formats defined property set 110 of driver 108). Stub 112 then invokes an interface exposed by driver 108 (e.g., a method on the DeviceIoControl function exposed by driver 108), passing to driver 108 any parameters received from application 102. Driver 108 and hardware 106 then perform the desired function as requested by application 102. Results and/or error information may optionally be returned by driver 108 through stub 112 and API 114 to application 102

(or alternatively by signaling an event or I/O completion port, as discussed in more detail below).

Different applications 102 (or even the same application 102) can perform I/O calls using different techniques, even though the same interface on API 114 is invoked for all of these different techniques. In certain embodiments, the different techniques that can be used by application 102 to perform I/O calls are referred to as overlapped I/O and completion ports. Using overlapped I/O, application 102 has an event handle associated with every I/O call made invoking an interface of API 114. When the I/O call is completed, the event (using that event handle) is signaled (e.g., by driver 108). This signaling of the event allows application 102 to know that the I/O call has been completed.

Using completion ports, however, a separate event handle is not used for each call. Rather, the hardware 106 and driver 108 are associated with a particular device handle (or other identifier), and this device handle is associated with an I/O completion port. Whenever an I/O call is completed, driver 108 signals the I/O completion port associated with driver 108. The process of signaling the I/O completion port includes identifying information of which I/O call is completed (e.g., a pointer to a data structure that describes the I/O call). Application 102 monitors this I/O completion port, such as by having a separate thread that waits on the completion port and then analyzes each signaling of the I/O completion port. This analysis includes identifying which I/O call was completed, so application 102 knows when the I/O call has been completed.

However, using overlapped I/O and completion ports are not always compatible with one another. Each of these techniques can perform actions that make the other operate incorrectly, which can result in the operating system failing to operate correctly (e.g., crashing). This incompatibility results primarily from driver 108 signaling the I/O completion port when an overlapped I/O call is completed.

Stub 112 includes a compatibility module 130 that resolves the overlapped I/O and completion ports techniques' incompatibilities by sending an indication to driver 108 that the I/O completion port should not be signaled when an overlapped I/O call is completed. This indication can be sent, for example, by setting a flag in the event handle associated with the overlapped I/O call (e.g., setting the least significant or low-order bit of the event handle). When the I/O call is completed, driver 108 recognizes that this flag has been set. In response to the flag being set, driver 108 will signal the event to indicate that the I/O call is completed, but will not signal the I/O completion port. By preventing the I/O completion port from being signaled for overlapped I/O calls, the incompatibility of the overlapped I/O and completion ports techniques is resolved, allowing the two techniques to be used concurrently.

It is to be appreciated that, although setting the flag in the event handle is discussed as an example of making the I/O completion ports and overlapped I/O techniques compatible, stub 112 can similarly be used to set other values for I/O calls to resolve the incompatibility between different techniques for making I/O calls. The exact nature of such setting values will vary based on the particular incompatibilities between the techniques. However, because stub 112 is acting as an intermediary and because all of the I/O calls will be passed through stub 112, stub 112 can set such values to resolve such incompatibilities.

By resolving the incompatibilities between different techniques for making I/O calls, stub 112 creates a solution that allows extensions to APIs to be made that are independent of the underlying technology or techniques used for making the I/O calls.

Resolving this incompatibility issue can be very useful, such as in situations where operating system 104 is being redesigned. For example, API 114 may be a new multimedia API that is designed to replace the DirectShow® API. This older or previous version of the API is also referred to as the legacy API or application. If the DirectShow® API is designed for applications 102 to use one technique (e.g., overlapped I/O), while the new multimedia API is designed to use a different technique (e.g., I/O completion ports), API extensions designed to work with the DirectShow® API and API extensions designed to work with the new multimedia API can both be used with stub 112. Very little, if any, changes need to be made to the API extensions designed to work with the DirectShow® API in order to work with stub 112 (e.g., they may need to be modified slightly to invoke the IKsControl interface of stub 112 rather than call the DeviceIoControl function of driver 108 themselves). This eases the transition process, allowing many of the legacy API extensions designed to be used with the DirectShow® API to be readily used with the new API 114 with little or no modification.

Figure 2:
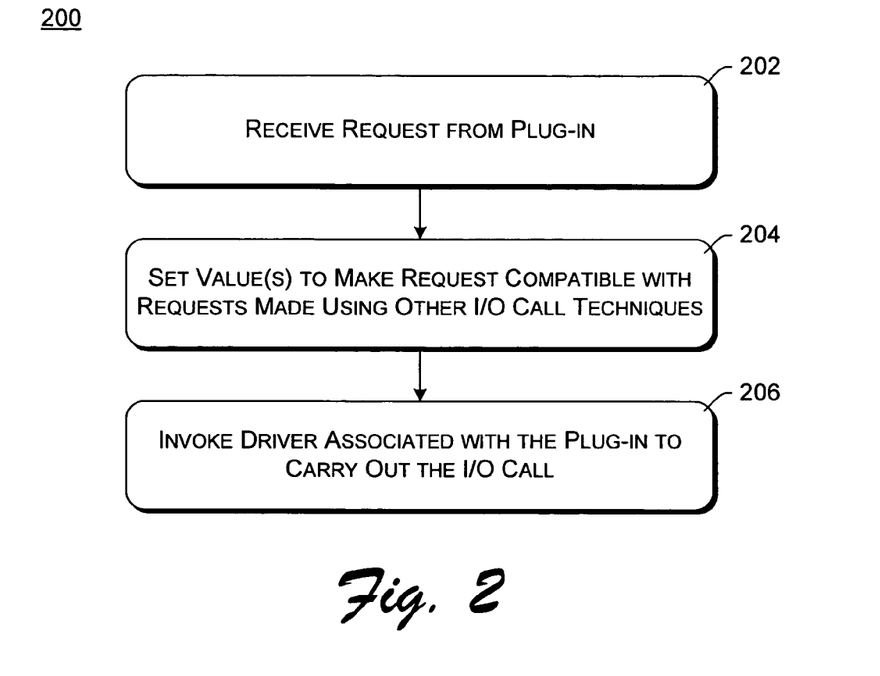
FIG. 2 is a flowchart illustrating an example process for invoking a driver.

FIG. 2 is a flowchart illustrating an example process 200 for invoking driver 108 of FIG. 1. Process 200 is carried out by stub 112 of FIG. 1, and is typically performed in software and/or firmware, although may alternatively be performed in hardware or some combination of software, firmware, and/or hardware.

Initially, a request is received from an API plug-in (act 202). This can be received in a variety of different manners, such as by invocation by the API plug-in of a method of an IKsControl interface exposed by the stub. The request received in act 202 is made by the API plug-in in response to an I/O call made by application 102 of FIG. 1. In response to the received request, the stub sets one or more values to make the request compatible with requests made using other I/O call techniques (act 204). This setting of values can be, for example, setting a flag in an event handle associated with the I/O call so that an I/O completion port is not signaled when the I/O call is completed.

The driver associated with the plug-in is then invoked to carry out the I/O call (act 206), such as by invoking a DeviceIoControl function of the driver. Any values that were received from the API plug-in as part of the request in act 202 are also passed to the driver in act 206. Additionally, any values set in act 204 are passed as appropriate to the driver in act 206 (e.g., the event handle with the flag set can be passed to the driver).

Returning to FIG. 1, oftentimes the API plug-ins (e.g., plug-in portion 118) are designed to be able to aggregate onto another object. Aggregation is a technique supported by objects (e.g., by COM objects) that allows interfaces from one or more objects to be exposed by one or more other objects as if they were part of those one or more other objects. Using aggregation, the various interfaces supported by the API plug-ins can be determined by invoking a Query Interface method on an exposed IUnknown interface of stub 112, resulting in pointers to the other interfaces exposed by stub 112 (including those having been aggregated onto stub 112) being returned to the caller.

Stub 112 includes an object aggregation module 132. Object aggregation module 132 allows other objects to be aggregated onto stub 112. In order to aggregate an object onto stub 112, a CoCreateInstance call (which is defined by COM) is made by module 132, including as parameters a class ID to be used to create the object being aggregated onto stub 112

(e.g., a GUID that uniquely identifies the class), and an identifier of the interface to be used to communicate with the object (this will be an additional interface exposed by stub 112). Once an object that is an API plug-in is aggregated onto stub 112, any interfaces exposed by that API plug-in are exposed by API 114.

The parameters for the CoCreateInstance call are obtained by object aggregation module 132. These parameters can be obtained, for example, by aggregation module 132 retrieving the parameters from some source, by an interface of API 114 passing the parameters to module 132, or alternatively by some other component or module of API 114 or OS 104 passing the parameters to module 132. These parameters can be obtained from different sources, such as an operating system registry (e.g., a Windows® operating system registry), provided by a designer of an API interface (e.g., hardcoded into a table of API 114), etc.). In certain embodiments, these parameters are provided to the source when the driver 108 and/or associated API plug-in are first installed on system 100. It should be noted that these parameters identify the object being aggregated onto stub 112, so identification of these parameters includes identification of the object to be aggregated onto stub 112.

Figure 3:
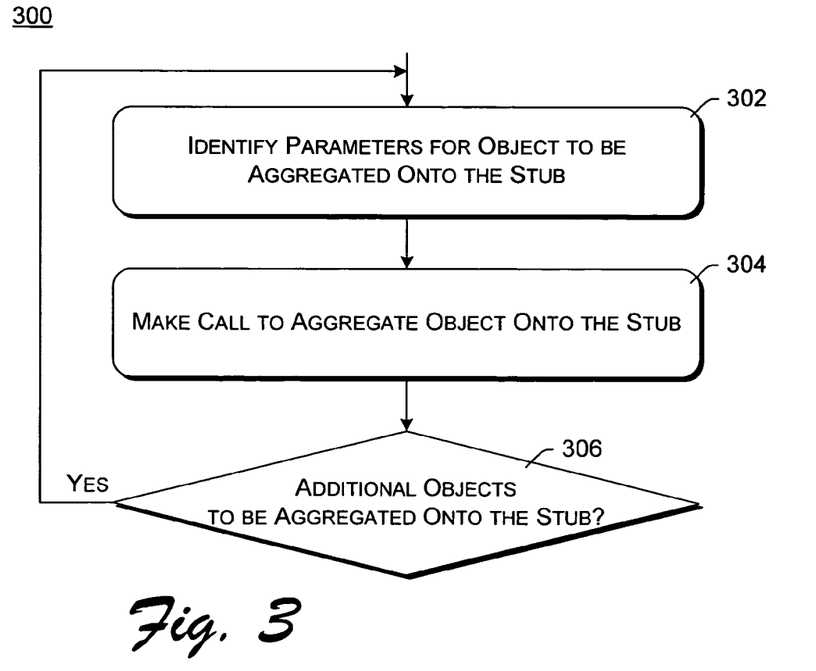
FIG. 3 is a flowchart illustrating an example process for aggregating an object onto a stub.

FIG. 3 is a flowchart illustrating an example process 300 for aggregating an object onto stub 112. Process 300 is carried out by stub 112, and is typically performed in software and/or firmware, although may alternatively be performed in hardware or some combination of software, firmware, and/or hardware.

Initially, the parameters for the object to be aggregated onto stub 112 are identified (act 302). This identification can be performed at different times, such as when stub 112 is instantiated, or when a request to access an interface exposed by the object is made (e.g., by application 102). As discussed above, these parameters can be retrieved by stub 112 or passed to stub 112. Given these parameters, a call is made to aggregate the object onto stub 112 (act 304). This call is, for example, the CoCreateInstance COM call. If there are additional object(s) to be aggregated onto stub 112, acts 302 and 304 are repeated (act 306).

Referring back to FIG. 1, in certain embodiments data flows into and out of driver 108 through one or more connection points referred to as "pins". A different property set 110 can be associated with each of these pins, allowing properties to be changed and thus allowing the way hardware 106 operates to be changed for different pins. Additionally, a separate stub 112 is included in API 114 for each of the different pins of driver 108 and is associated with one of the pins (e.g., with each stub having a single associated pin). In some situations, in order to access the correct property set 110, application 102 may request an identifier of a particular pin of driver 108 from API 114. This identifier of a particular pin of driver 108 is also referred to as a stream index.

In order to support such requests for stream indexes, in certain embodiments stub 112 exposes an interface referred to as an IGetStreamIndex interface. The IGetStreamIndex interface has a method referred to as GetStreamIndex that retrieves the stream index for a particular stub 112, which is the pin of driver 108 that the particular stub 112 is associated with. An example of the IGetStreamIndex interface is listed in Table V.

TABLE V

IGetStreamIndex::GetStreamIndex
   Syntax

HRESULT GetStreamIndex(
  ULONG* pStreamIndex
);

TABLE V-continued

Parameters pStreamIndex
   [out] The stream index associated with the Stub.
Return Values If the method succeeds, it returns S_OK. If pStreamIndex is NULL it will return E_INVALIDARG. Other error codes may be returned.
   Remarks Some property sets or extension methods require a Stream ID as one of the parameters. This interface is a method of acquiring these Stream IDs.

Figure 4:
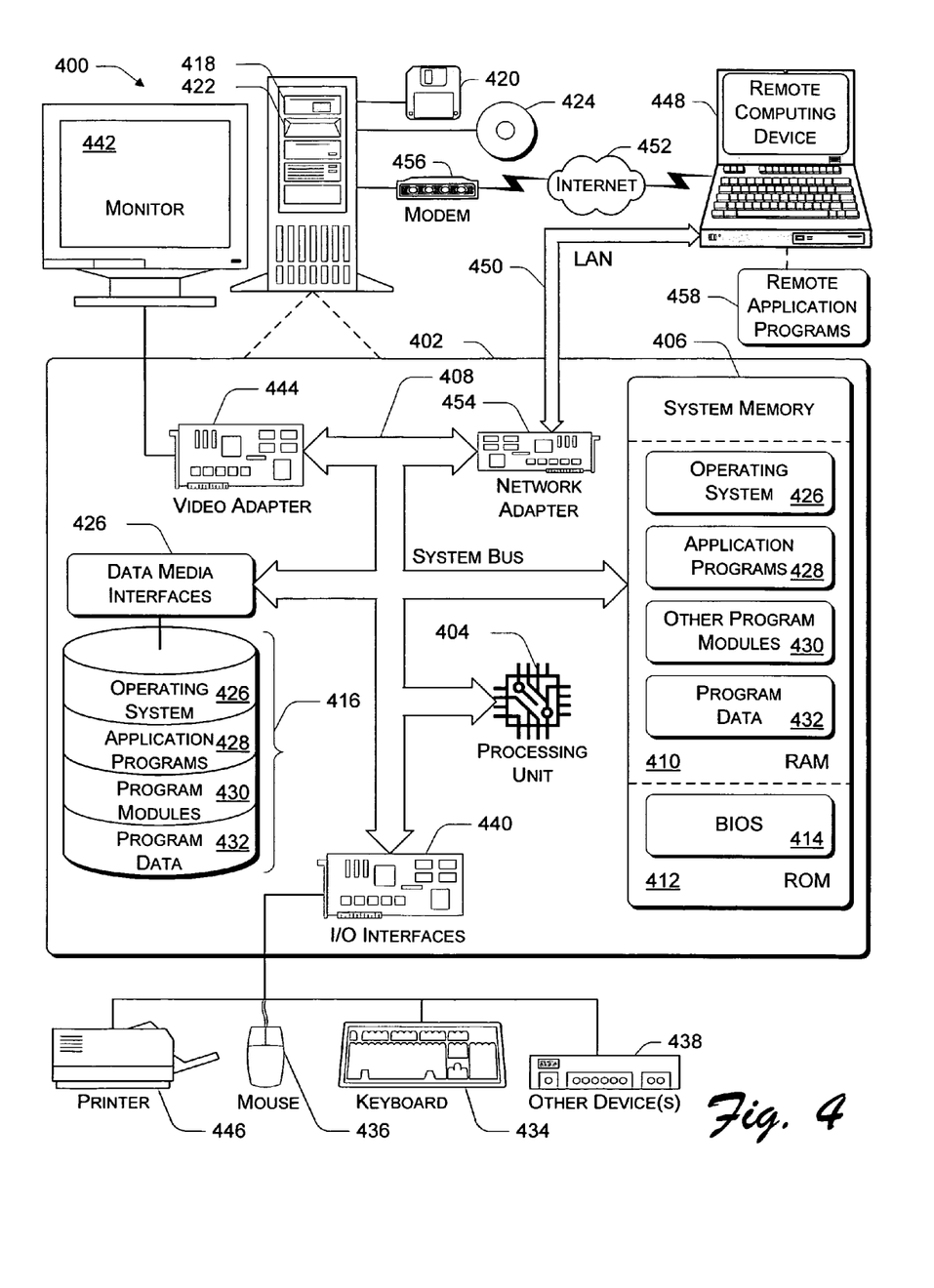
FIG. 4 illustrates a general computer environment which can be used to implement the systems and methods for supporting new and existing extensions to application programming interfaces described herein.

FIG. 4 illustrates a general computer environment 400, which can be used to implement the systems and methods for supporting new and existing extensions to application programming interfaces described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a device on which system 100 of FIG. 1 can be implemented. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 432 for reading from and writing to a removable, non-volatile magnetic disk 420 (e.g., a "floppy disk"), and an optical disk drive 422 for reading from and/or writing to a removable, nonvolatile optical disk 424 such as a CD-ROM, DVD-ROM, or other optical media. The hard disk drive 416, magnetic disk drive 432, and optical disk drive 422 are each connected to the system bus 408 by one or more data media interfaces 426. Alternatively, the hard disk drive 416, magnetic disk drive 432, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when instantiated and executed by one or more processors of a device, causes the one or more processors to:

receive, from an interface exposed by an additional object, a request associated with an Input/Output (I/O) call, wherein the additional object is one of a Application Programming Interface (API) plug-in or a API extension, and wherein the API plug-in is a contemporary API plug-in or a previous version API plug-in;

set, by a Component Object Model (COM) object, on behalf of the additional object, one or more setting values for the request so that the I/O call can be completed in a manner that is compatible with other I/O calls, wherein the setting comprises setting, in an event handle, a flag indicating that an I/O completion port is not to be signaled by a driver upon completion of the I/O call when the request is received from the previous version API plug-in, and not setting, in the event handle, the flag indicating that the I/O completion port is not to be signaled by the driver upon completion of the I/O call when the request is received from the contemporary API plug-in; and invoke a driver to carry out the I/O call, the driver being associated with the additional object.

2. One or more computer readable media as recited in claim 1, wherein to receive the request is to:
receive the request via an IKsControl interface.

3. One or more computer readable media as recited in claim 1, wherein to invoke the driver is to:
call a DeviceIoControl function on the driver with one or more parameters from the request.

4. One or more computer readable media as recited in claim 1, wherein the plurality of instructions further cause the one or more processors to:
aggregate the additional object onto a first object, the additional object being an Application Programming Interface (API) extension.

5. One or more computer readable media as recited in claim 4, wherein to aggregate the additional object onto the first object is to aggregate the additional object onto the first object when the first object is instantiated.

6. One or more computer readable media as recited in claim 4, wherein to aggregate the additional object onto the first object is to aggregate the additional object onto the first object when a request to access an interface exposed by the additional object is made.

7. One or more computer readable media as recited in claim 4, wherein the first object comprises a Component Object Model (COM) object.

8. One or more computer readable media as recited in claim 4, wherein the plurality of instructions further cause the one or more processors to:
obtain parameters identifying the additional object to be aggregated onto the first object.

9. One or more computer readable media as recited in claim 4, wherein the plurality of instructions is implemented in an operating system of the device, and the API extension is an extension written by a third party to be added to an API of the operating system.

10. One or more computer readable media as recited in claim 4, wherein the plurality of instructions further cause the one or more processors to:
receive, from the API extension, a request for a stream index associated with the first object; and
return, in response to the request, the stream index associated with the first object.

11. One or more computer readable media as recited in claim 4, the first object is a stub object that operates as an intermediary between the API extension and the driver.

12. One or more computer readable storage media having stored thereon a plurality of instructions that, when executed by one or more processors of a device, causes the one or more processors to:
expose an IKsControl Component Object Model (COM) interface that can be invoked by both Application Programming Interface (API) extensions designed to work with a DirectShow® API and API extensions designed to work with an API to replace the DirectShow® API;
invoke a driver associated with one of the API extensions whenever a call is made by the API extension via the IKsControl COM interface regardless of whether the API extension is designed to work with the DirectShow® API or with the API to replace the DirectShow® API;
identify an event handle for the call; and
prior to the driver being invoked, set a flag in the event handle indicating that an API completion port is not to be signaled by the driver when the call is completed when the request is received from the DirectShow® API, and not set the flag in the event handle indicating that the I/O completion port is not to be signaled by the driver when the call is completed when the request is received from the API to replace the DirectShow® API.

13. A method implemented on a computer system, the method comprising:
receiving by a Component Object Model (COM) object, from an Application Programming Interface (API) plug-in, a request associated with an Input/Output (I/O) call, the API plug-in including one or more interfaces to allow an application to invoke functionality supported by a driver associated with the API plug-in, wherein the API plug-in is a contemporary API plug-in or a previous version API plug-in;
setting, by the COM object on behalf of the API plug-in, one or more setting values for the request so that the request is compatible with requests associated with other I/O calls, wherein the setting comprises setting, in an event handle, a flag indicating than in I/O completion port is not to be signaled by the driver upon completion of the I/O call when the request is received from a previous version API plug-in, and not setting, in the event handle, the flag indicating that the I/O completion port is not to be signaled by the driver upon completion of the I/O call when the request is received from a contemporary API plug-in; and
invoking the driver to carry out the I/O call.

14. A method as recited in claim 13, the setting comprising: wherein the other I/O calls are made by other applications.

15. A method as recited in claim 13, the setting comprising: the request having been made in response to the I/O call being made by the application invoking one of the one or more interfaces.

16. A method as recited in claim 13, the receiving comprising:
receiving the request via an IKsControl Component Object Model (COM) interface exposed by a COM object implementing the method.

17. A method as recited in claim 13, the invoking the driver comprising:
calling a DeviceIoControl function on the driver with one or more parameters from the request.

18. A method as recited in claim 13, wherein the method is implemented in an operating system of a computing device.

19. A method as recited in claim 18, wherein the API plug-in is a component written by a third party to be added to an API of the operating system.

20. A method as recited in claim 13, the method being implemented by a Component Object Model (COM) object, the method further comprising:
   aggregating an additional object onto the COM object, the additional object being an additional API plug-in.

21. A method as recited in claim 20, further comprising:
   obtaining parameters identifying the additional object to be aggregated onto the COM object.

22. A system comprising:
   memory;
   one or more processors operatively coupled to the memory;
   an object aggregation module configured to aggregate an additional object onto a first object,
   wherein the additional object is one of a Application Programming Interface (API) plug-in or a API extension, and wherein the API plug-in is a contemporary API plug-in or a previous version API plug-in; and
   a compatibility module configured to set one or more setting values for a request received from an interface exposed by the additional object, the request being associated with an Input/Output (I/O) call, the one or more setting values being set so that the I/O call can be completed in a manner that is compatible with other I/O calls, based on whether the request is received from an interface exposed by the contemporary API plug-in or from an interface exposed by the previous version API plug-in, and further to invoke a driver to carry out the I/O call, the driver being associated with the additional object,
   wherein set the one or more setting values comprises identify an event handle for the I/O call, and
   set, in the event handle, a flag indicating that an I/O completion port is not to be signaled by the driver when the I/O call is completed when the request is received from the previous version API plug-in, and not set, in the event handle, the flag indicating that the I/O completion port is not to be signaled by the driver when the I/O call is completed when the request is received from the contemporary API plug-in.

* * * * *